United States Patent
Di-Crescenzo et al.

(10) Patent No.: US 6,216,128 B1
(45) Date of Patent: Apr. 10, 2001

(54) SYSTEM AND METHOD FOR PRIVATE INFORMATION RETRIEVAL FROM A SINGLE ELECTRONIC STORAGE DEVICE USING COMMODITIES

(75) Inventors: Giovanni Di-Crescenzo, Morris Township, Morris County, NJ (US); Yuval Ishai, Haifa (IL); Rafail Ostrovsky, Secaucus, NJ (US)

(73) Assignee: Telcordia Technologies, Inc., Morristown, NJ (US)

(*) Notice: Subject to any disclaimer, the term of this patent is extended or adjusted under 35 U.S.C. 154(b) by 0 days.

(21) Appl. No.: 09/260,110

(22) Filed: Mar. 2, 1999

Related U.S. Application Data

(60) Provisional application No. 60/061,632, filed on Oct. 9, 1997.

(51) Int. Cl.[7] .................................................. G06F 17/30
(52) U.S. Cl. ........................... 707/10; 707/3; 707/9; 709/203; 709/219; 709/229
(58) Field of Search .................. 707/3, 9, 10; 709/203, 709/229, 219

(56) References Cited

U.S. PATENT DOCUMENTS

| | | | |
|---|---|---|---|
| 5,885,018 | * 12/1998 | Chor et al. | 707/9 |
| 6,029,195 | * 2/2000 | Herz | 709/219 |

OTHER PUBLICATIONS

Di Crescenzo et al., "Universal service–providers for database private information retrieval", Proc. of 17th Annual ACM Symposium on Principles of Distributed Computing, Jun. 1998, Abstract Only.*

B. Chor and O. Goldreich et al., "Private Information Retrieval," 36th Annual IEEE Symposium On Foundations of Computer Science (1995), pp. 41–50.

A. Ambainis, "Upper Bound On The Communications complexity of Private Information Retrieval," proceeding of 24th International Colloquium on Automata Languages and Programming, vol. 1256 (1997), pp. 401–407.

B. Chor and N. Gilboa, "Computationally Private Information Retrieval," 29th Symposium on the Theory of Computing (1997), pp. 304–313.

R. Ostrovsky and V. Shoup, "Private Information Storage," 29th Symposium on the Theory of Computing (1997), pp. 294–303.

E. Kushilevitz and R. Ostrovsky, "Replication Is Not Needed: Single Database, Computationally Private Information Retrieval," 38th Annual IEEE Symposium on the Foundations of Computer Science (1997), pp. 364–373.

D. Beaver, "Commodity–Based Cryptography," 29th Symposium of Theory of Computing (1997), pp. 446–455.

G. Di–Crescenzo, Y Ishai, and R. Ostrovsky, "Universal Service–Providers For Database Private Information Retrieval," ACM Symposium on Principles of Distributed Computing (1998), pp. 1–25.

* cited by examiner

*Primary Examiner*—Jean R. Homere
(74) *Attorney, Agent, or Firm*—Joseph Giordano

(57) ABSTRACT

A method and system for privately retrieving selected information from a database. The method includes determining, at a server, a first commodity and a second commodity, communicating the first commodity to an inquiring processor and the second commodity to the database, and retrieving the selected information from the database based on the first commodity and the second commodity such that the selected information is not revealed to the database. The first and second commodities may, for example, include a random address in the database and a private information retrieval query for encoding the random address, respectively. The inquiring processor determines an address offset based on the random address and the address of selected information in the database, and sends the address offset to the database. The database cyclically shift its contents according the address offset, and executes the query on the cyclically shifted contents. The database then sends the result of the query to the inquiring processor, which extracts from the result the selected information in the database.

11 Claims, 6 Drawing Sheets

SYSTEM AND METHOD FOR PRIVATE INFORMATION RETRIEVAL FROM A SINGLE ELECTRONIC STORAGE DEVICE USING COMMODITIES

CROSS-REFERENCE TO RELATED APPLICATIONS

This application is related to U.S. application Ser. No. 09/087,893, filed Jun. 1, 1998, which claims the benefit of U.S. Provisional Application No. 60/061,632, filed Oct. 9, 1997, the contents of both of which are hereby incorporated by reference.

BACKGROUND OF THE INVENTION

The present invention relates generally to information retrieval from electronic storage devices, and more particularly, to a method and system for private information retrieval from an electronic storage device using one or more servers.

With the advancement of Internet communications, the need for private information retrieval is increasing. For example, if a company maintains an Internet website with a complete listing of patents, competitors may be interested in searching those patents when introducing competitive products or services. Without privacy from the inquirer, the company can monitor database inquiries into its patent portfolio and gain knowledge as to the identity of the patents in which the competitors are interested. Thus, there is a need for privately retrieving selected information from an electronic storage device such that the information is not revealed to the storage device.

Private information retrieval ("PIR") schemes allow a user to retrieve information from an electronic storage device while maintaining the privacy of the queries from the electronic storage device. As used herein, "electronic storage device" refers to any processing system that stores information that a user at an inquiring processor may wish to retrieve. Moreover, the terms "electronic storage device" and "database" will be used interchangeably and should be understood in their broadest sense.

The least sophisticated method for performing a private information retrieval is to request a copy of the entire database. This, of course, hides the particular information sought by the inquiring processor, but requires an impractical exchange of information between the database and the inquiring processor. Moreover, when a database is large and its contents frequently change, the inquiring processor must receive frequent and possibly costly updates whenever the database changes.

Another PIR method requires replication of the database at alterative sites that do not communicate with one another. This replication technique is disclosed in B. Chor and O. Goldreich et al., "Private Information Retrieval," 36th Annual IEEE Symposium On Foundations Of Computer Science (1995), A. Ambainis, "Upper Bound On The Communication Complexity Of Private Information Retrieval," in the proceedings of 24th International Colloquium on Automata Languages and Programming, Volume 1256 (1997), B. Chor and N. Gilboa, "Computationally Private Information Retrieval," 29th Symposium On The Theory Of Computing, and R. Ostrovsky and V. Shoup, "Private Information Storage," 29th Symposium On The Theory Of Computing. To assure privacy of the requested information, this method requires replication of the database at alternative sites that do not communicate with one another.

An improved PIR method that does not require replication of a database at alternative sites is disclosed in pending U.S. patent application Ser. No. 09/087,893, entitled "Method And Apparatus For Private Information Retrieval From A Single Electronic Storage Device," and E. Kushilevitz and R. Ostrovsky, "Replication Is Not Needed: Single Database, Computationally Private Information Retrieval," in the proceedings of $38^{th}$ Annual IEEE Symposium on the Foundations of Computer Science (1997). This improved PIR method privately retrieves selected information from a portion of or an entire database without revealing to the database the address of the selected information. The method conceals the address of selected information in an encoding function that hides or conceals the address from the database. The database applies the encoding function to the relevant portion of database, and returns the result back to an inquiring processor. A disadvantage of the method is the attendant complexities associated with determining, at the inquiring processor, an encoding function that can conceal the address of the selected information from the database.

Another method, which uses a plurality of servers, is disclosed in D. Beaver, "Commodity-Based Cryptography," in the proceedings of 29th Symposium Of Theory Of Computing (1997), pages 446–455. The Beaver method describes an oblivious transfer protocol for private information exchange between an inquiring processor and a database. The inquiring processor and the database receive from a plurality of servers commodities, which the inquiring processor and the database use to privately exchange information with each other. The Beaver method, however, has two disadvantages: First, it does not reduce the attendant complexities associated with privately retrieving selected information from a database. Second, to assure private information retrieval, the Beaver method requires that at least half of the servers do not communicate with one another, a requirement which may not be practically enforced against servers.

Therefore, it is desirable to have a method and system for private information retrieval which overcome the disadvantages of the prior art.

DESCRIPTION OF THE INVENTION

Methods and systems consistent with the present invention privately retrieve selected information from a database, which includes, for example, N bits of information, by determining, at a server, a first commodity and a second commodity, communicating the first commodity to an inquiring processor and the second commodity to the database, and retrieving the selected information from the database based on the first commodity and the second commodity such that the selected information is not revealed to the database. The first commodity may include, for example, a random address in the database and trapdoor information for decoding query results received from the database by the inquiring processor. The second commodity may include, for example, a query for encoding the random address. The query may be determined using any conventional private information retrieval method or system.

The inquiring processor determines an address offset based on the random address and the address of selected information in the database, and sends the address offset to the database. The database cyclically shift its contents according the address offset, and executes the query on the cyclically shifted contents. The database then sends the result of the query to the inquiring processor, which extracts from the result the selected information in the database.

Methods and systems consistent with the present invention privately retrieve selected information from a database by combining commodities from a plurality of servers such that the selected information is not revealed to the database. A first server determines a first commodity and a second commodity, and a second server determines a third commodity and a fourth commodity. The first server communicates the first and the second commodities to an inquiring processor and the database, respectively. The first commodity may include, for example, a first random address in the database and trapdoor information for decoding query results received from the database by the inquiring processor. The second commodity may include, for example, a first query for encoding the first random address.

Likewise, the second server communicates the third and the fourth commodities to the inquiring processor and the database, respectively. The third commodity may include, for example, a second random address in the database and trapdoor information for decoding query results received from the database by the inquiring processor. The fourth commodity may include, for example, a second query for encoding the second random address, respectively. The second query may also be determined using any conventional private information retrieval method or system.

The database then combines the first and the second queries as follows: The inquiring processor determines a first address offset based on the first random address and the address of selected information in the database. The inquiring processor determines a second address offset based on the second random address and the first address offset, and sends the second address offset to the database. The database executes the first query, and stores the result of the first query. The database then cyclically shifts its contents in, for example, 1 bit increments N times, reexecutes the first query on each cyclically and incrementally shifted content, and stores the results of the N executions in the order of execution.

The database then cyclically shifts the stored results of the executions according to the second address offset, executes the second query on the cyclically shifted stored results, and sends the result to the inquiring processor. The inquiring processor then extracts the selected information in the database from the result received from the database.

In addition, methods and systems consistent with the present invention may verify the validity of a commodity determined by a server. The server identifies an address in the first database, and determines a private information retrieval query for encoding the address. It sends the address to an inquiring processor and the query to the first database. The first database executes the query on a second database, whose contents are known to the inquiring processor, and sends the result of the query to the inquiring processor. The inquiring processor decodes the result of the query to verify the validity of the query based on the identified address.

Alternatively, methods and systems consistent with the present invention may verify the validity of a commodity when privately retrieving selected information from a first database based on that commodity. A server identifies a first address in the first database, and determines a private information retrieval query for encoding the first address. It sends the first address to an inquiring processor and the query to the first database. The inquiring processor identifies a second address in the first database that includes selected information, which the inquiring processor desires to retrieve. The first database executes the query on a second database whose contents are known to the inquiring processor, and sends a first result of the query to the inquiring processor.

The first database then combines the first and second databases, executes the query based on the combined first and second databases, and sends a second result of the query to the inquiring processor. The inquiring processor decodes the first and the second results received from the first database, and extracts the selected information from the first and the second decoded results.

Methods and systems consistent with the present invention have several advantages over the prior art. First, the present invention reduces the complexity and the extent of communication between an inquiring processor and a database. The complex task of determining private information retrieval queries for encoding database addresses is delegated to one or more servers, and can be performed prior to, and independently of, an inquiry by the inquiring processor. Second, methods and systems consistent with the present invention can assure private information retrieval even though all but one of a plurality of servers communicate or collude with each other.

The description of the invention and the following description for carrying out the best mode of the invention should not restrict the scope of the claimed invention. Both provide examples and explanations to enable others to practice the invention. The accompanying drawings, which form part of the description for carrying out the best mode of the invention, show several embodiments of the invention, and together with the description, explain the principles of the invention.

BEST MODE FOR CARRYING OUT THE INVENTION

Reference will now be made in detail to the preferred embodiments of the invention, examples of which are illustrated in the accompanying drawings. Wherever possible, the same reference numbers will be used throughout the drawings to refer to the same or like parts.

Figure 1:
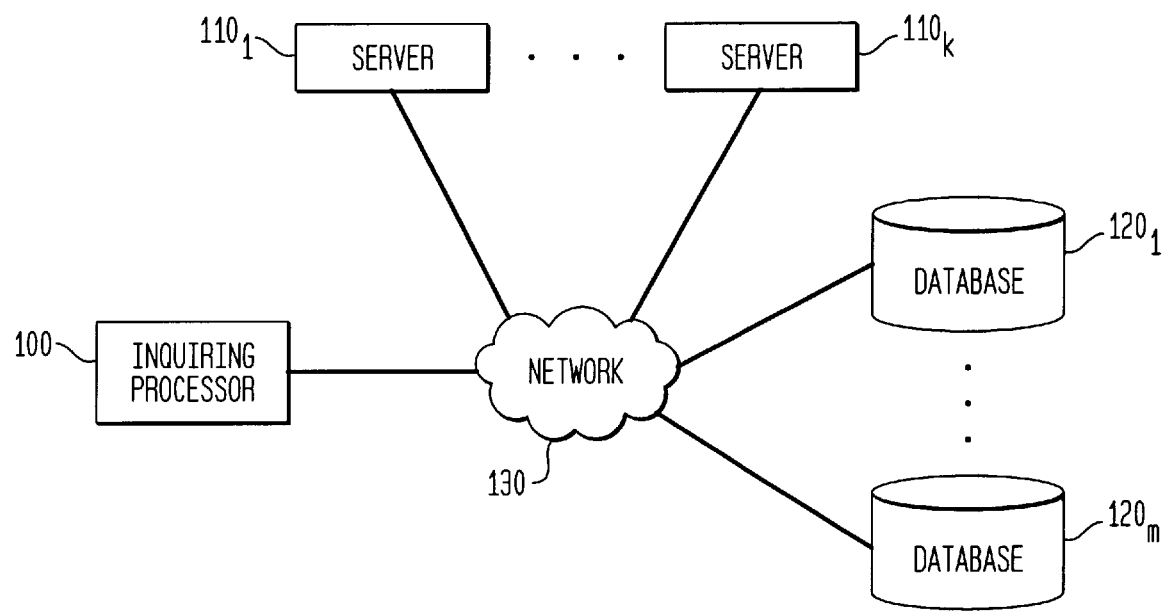
FIG. 1 is a block diagram of an inquiring processor connected to a plurality of servers and databases via a network, in accordance with an embodiment of the present invention.

FIG. 1 is a block diagram of an inquiring processor 100 connected via a network 130 to a plurality of servers $110_1$ through $110_K$ and databases $120_1$ through $120_M$, in accordance with an embodiment of the present invention. Inquiring processor 100 may comprise any form of computer capable of generating and transmitting an address offset to one or more databases $120_1$–$120_M$, and decoding the results provided by databases $120_1$–$120_M$. Inquiring processor 100 can be programed with appropriate application software to implement the methods and systems described herein.

Network 130 comprises any conventional communications network either internal or external, for affecting communication between inquiring processor 100, servers $110_1$–$110_K$, and databases $120_1$–$120_M$. Network 130 may comprise, for example, an internal local area network or a large external network, such as the Internet.

Servers $110_1$–$110_K$ each comprise any form of computer capable of generating off-line or on-line messages (referred to as commodities) for use by inquiring processor 100 and one or more databases $120_1$–$120_M$ for affecting private information exchange between inquiring processor 100 and one or more databases $120_1$–$120_M$. Databases $120_1$–$120_M$ each include any conventional data storage or any set of records or data, which are, for example, stored as bits.

Figure 2:
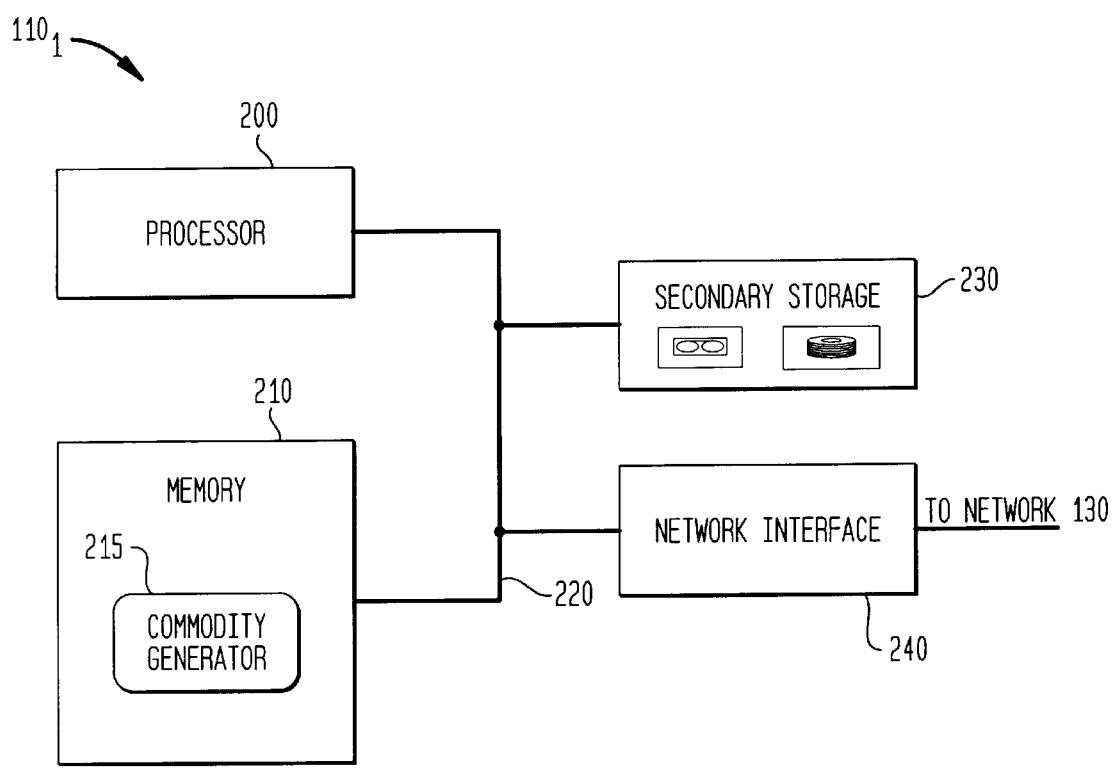
FIG. 2 is a block diagram of a server, in accordance with an embodiment of the present invention.

FIG. 2 is a block diagram of server $110_1$, in accordance with an embodiment of the present invention. Server $110_1$ comprises processor 200 connected via bus 220 to a memory 210, a secondary storage 230, and a network interface card 240, which interfaces with network 130. Memory 210 comprises a commodity generator program 215 (Commodity Generator) that includes instructions in the form of software that processor 200 executes.

Secondary storage 230 comprises a computer readable medium such as a disk drive and a tape drive. From the tape drive, software and data may be loaded onto the disk drive, which can then be copied into memory 210. Similarly, software and data in memory 210 may be copied onto the disk drive, which can then be loaded onto the tape drive.

Figure 3:
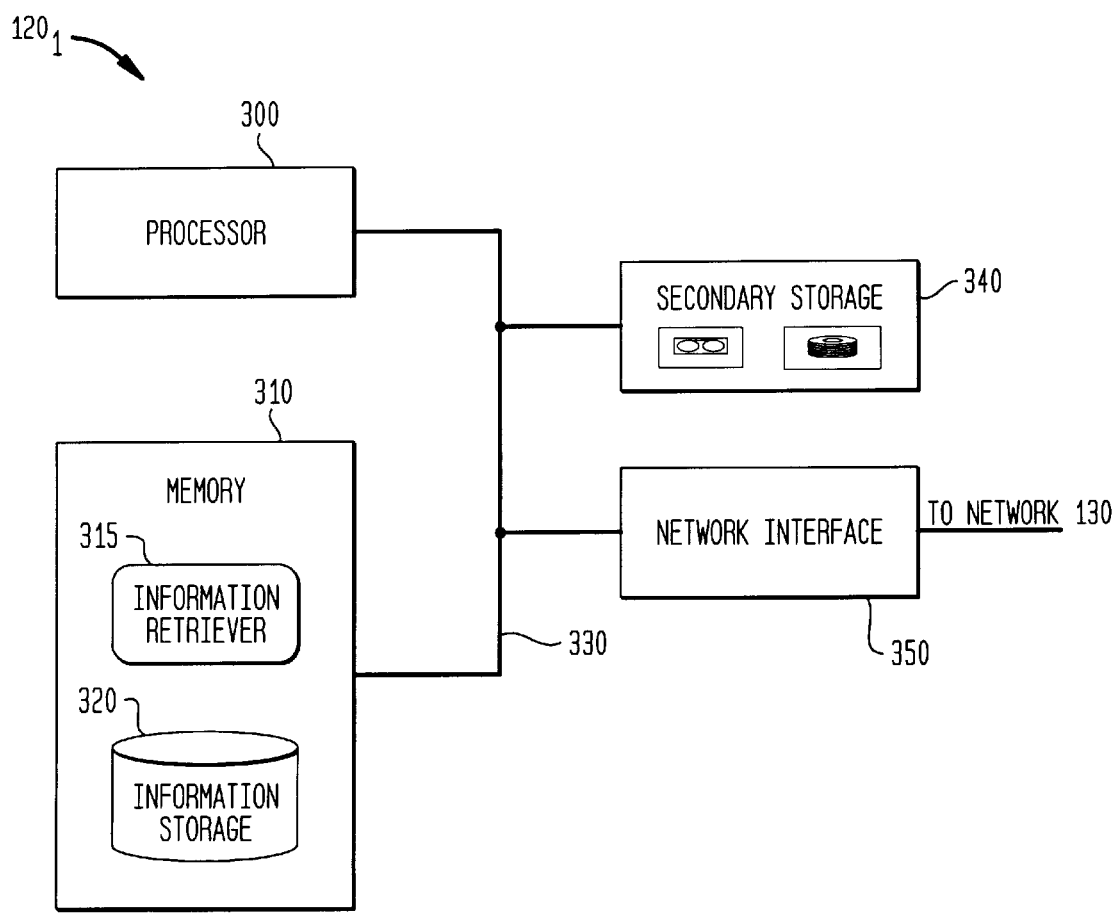
FIG. 3 is a block diagram of a database, in accordance with an embodiment of the present invention.

FIG. 3 is a block diagram of database $120_1$, in accordance with an embodiment of the present invention. Database $120_1$ comprises processor 300 connected via bus 330 to a memory 310, a secondary storage 340, and a network interface card 350, which interfaces with network 130.

Memory 310 comprises a information retriever program 315 (Retriever) and an information storage 320 (Storage). Retriever 315 includes instructions in the form of software that processor 300 executes. Storage 320 includes any set of records, entries, or data, stored, for example, as bits.

Secondary storage 340 comprises a computer readable medium such as a disk drive and a tape drive. From the tape drive, software and data may be loaded onto the disk drive, which can then be copied into memory 310. Similarly, software and data in memory 310 may be copied onto the disk drive, which can then be loaded onto the tape drive.

Figure 4:
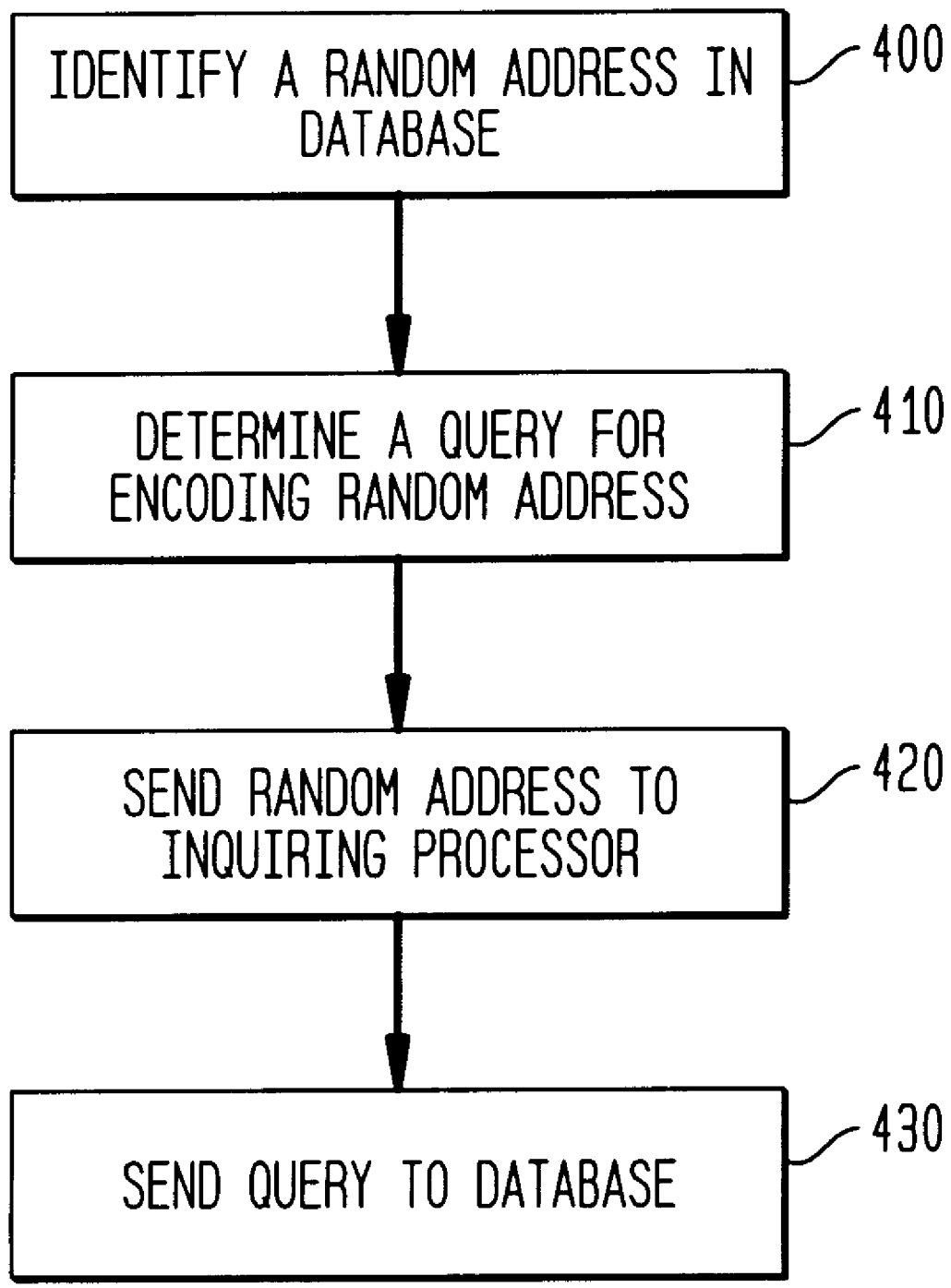
FIG. 4 is a flow chart of the steps performed by a server, in accordance with an embodiment of the present invention.

FIG. 4 is a flow chart of the steps performed by Commodity Generator 215 for affecting a private information exchange between inquiring processor 100 and database $120_1$, in accordance with an embodiment of the present invention. Commodity Generator 215 determines two commodities, one directed to inquiring processor 100 and the other directed to database $120_1$. Commodity Generator 215 uses, for example, a probabilistic polynomial time sampling method to identify a random address in database $120_1$ (step 400) and to assemble a private information retrieval query for encoding the random address such that the random address is not revealed to database $120_1$ (step 410).

In an embodiment where contents of database $120_1$ are not replicated in any of databases $120_2$–$120_M$, the query may be determined using any conventional private information retrieval method or system, for example the methods and systems described in pending U.S. patent application Ser. No. 09/087,893, entitled "Method And Apparatus For Private Information Retrieval From A Single Electronic Storage Device," and E. Kushilevitz and R. Ostrovsky, "Replication Is Not Needed: Single Database, Computationally Private Information Retrieval," in the proceedings of $38^{th}$ Annual IEEE Symposium on the Foundations of Computer Science (1997), the contents of both of which are incorporated herein in their entireties by reference.

Alternatively, in an embodiment where contents of database $120_1$ are replicated in one or more of databases $120_2$–$120_M$ and databases $120_1$–$120_M$ do not communicate with one another, the query may be determined using any conventional private information retrieval method or system for multiple non-communicating databases, for example the methods and systems described in G. Di-Crescenzo, Y. Ishai, and R. Ostrovsky, "Universal Service-Providers For Database Private Information Retrieval," ACM Symposium on Principles of Distributed Computing (1998), B. Chor and O. Goldreich et al., "Private Information Retrieval," 36th Annual IEEE Symposium On Foundations Of Computer Science (1995), and A. Ambainis, "Upper Bound On The Communication Complexity Of Private Information Retrieval," in the proceedings of 24th International Colloquium on Automata Languages and Programming, Volume 1256 (1997), the contents of all of which are incorporated herein in their entireties by reference.

Commodity Generator 215 sends to inquiring processor 100 the random address and trapdoor information for decoding query results received from database $120_1$ by inquiring processor 100 (step 420), and sends the query to database $120_1$ (step 430).

When inquiring processor 100 receives the random address from server $110_1$, inquiring processor 100 identifies the address of selected information in database $120_1$, which inquiring processor 100 desires to privately retrieve without revealing the address of the selected information to database $120_1$. Inquiring processor 100 determines an address offset by subtracting modulo N the random address received from server $110_1$ from the address of the selected information, and sends the address offset to database $120_1$.

Figure 5:
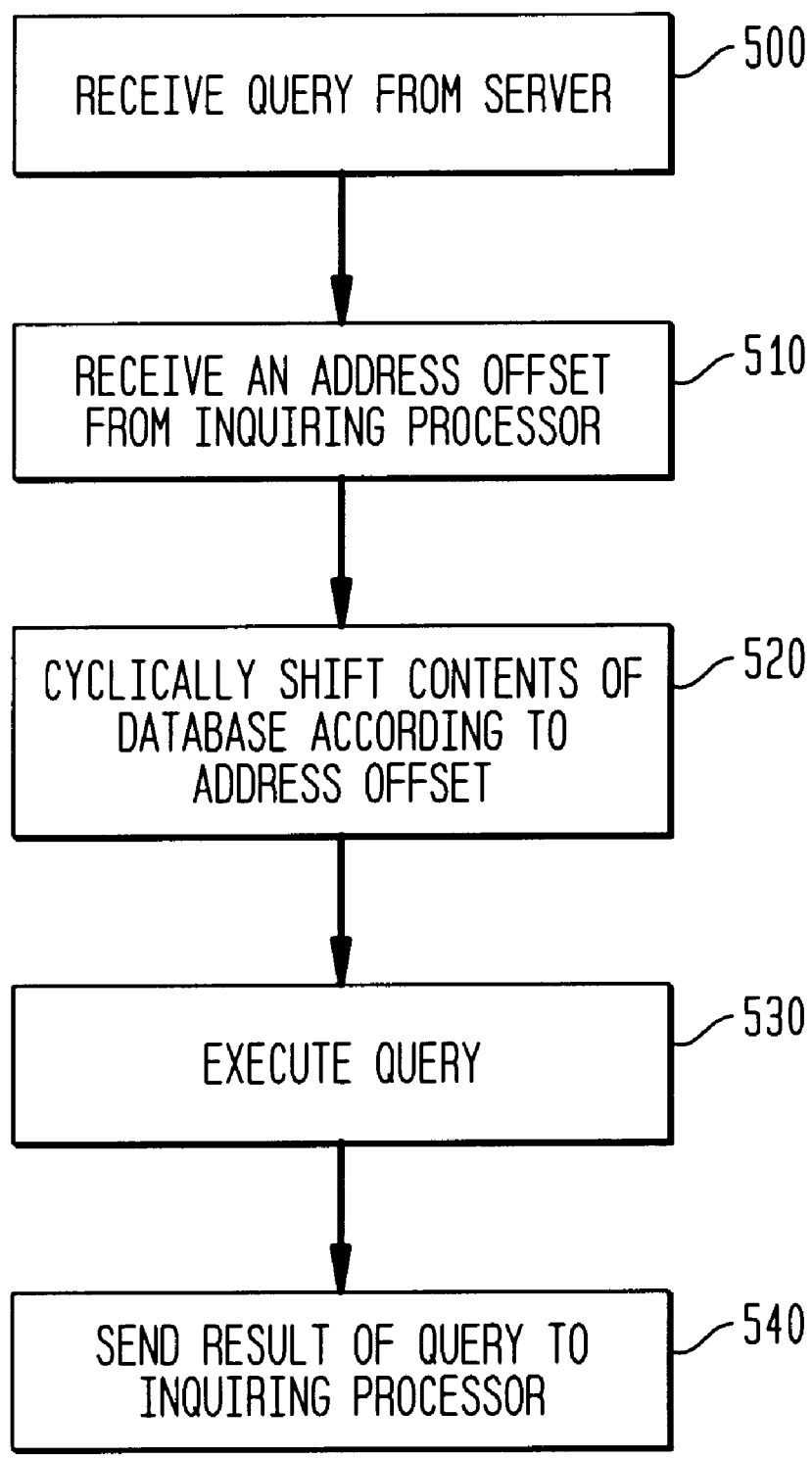
FIG. 5 is a flow chart of the steps performed by a database for privately retrieving information based on a single commodity, in accordance with an embodiment of the present invention.

FIG. 5 is a flow chart of the steps performed by Retriever 315 when it receives a query from server $110_1$ (step 500) and an address offset from inquiring processor 100 (step 510). Retriever 315 then cyclically shifts the bits in Storage 320 according to the address offset (step 520). Retriever 315 then executes the query on the cyclically shifted bits (step 530), and sends the result of the query to inquiring processor 100 (step 540).

When inquiring processor 100 receives the results of the query, it extracts the selected information in database $120_1$ from the result using, for example, the methods and systems disclosed in pending U.S. patent application Ser. No. 09/087,893, entitled "Method And Apparatus For Private Information Retrieval From A Single Electronic Storage Device," and E. Kushilevitz and R. Ostrovsky, "Replication Is Not Needed: Single Database, Computationally Private Information Retrieval," in the proceedings of $38^{th}$ Annual IEEE Symposium on the Foundations of Computer Science (1997).

Figure 6:
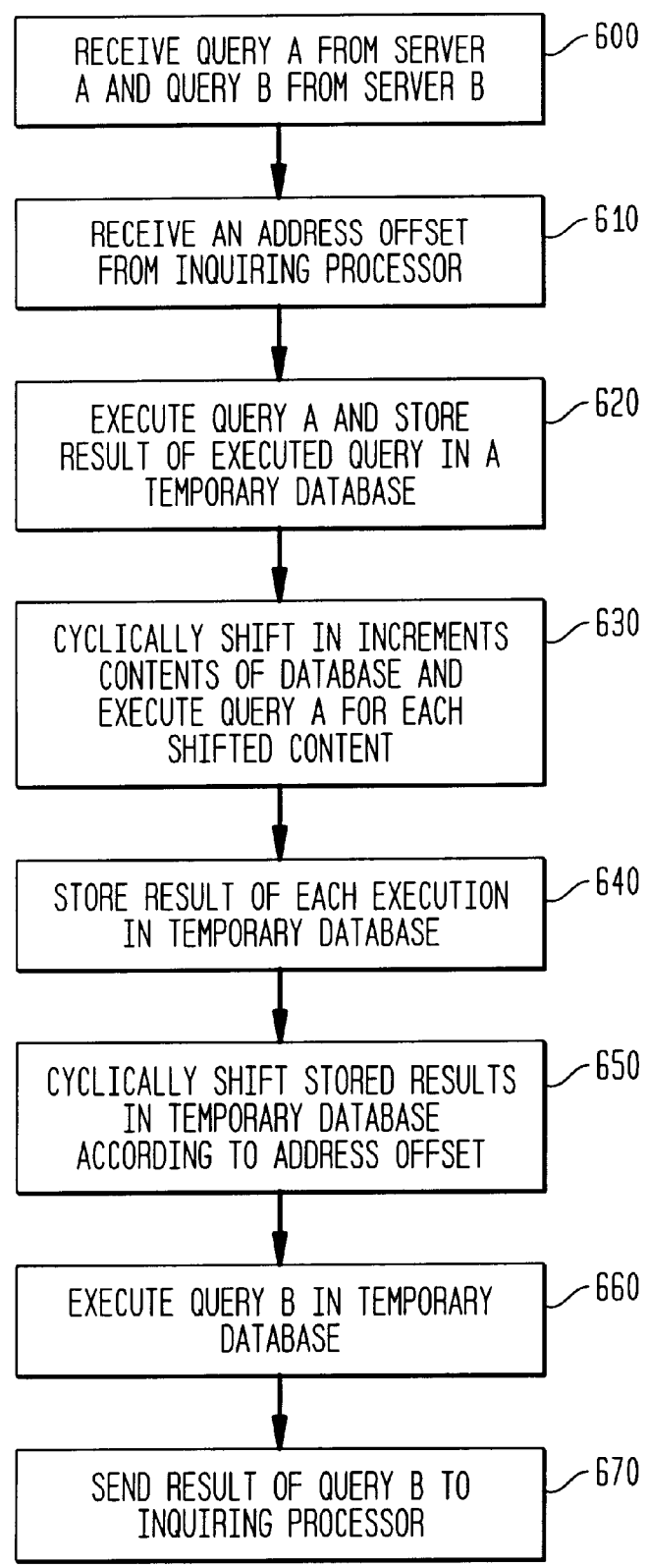
FIG. 6 is a flow chart of the steps performed by a database for privately retrieving information based on a plurality of commodities, in accordance with an embodiment of the present invention.

FIG. 6 is a flow chart of the steps performed by Retriever 315 for privately retrieving information using commodities generated by servers $110_1$ and $110_2$, respectively, in accordance with an embodiment of the present invention. Retriever 315 receives query A from server $110_1$ and query B from server $110_2$ (step 600), where queries A and B each include, for example, a private information retrieval encoding function. Retriever 315 also receives an address offset from inquiring processor 100 (step 610). Retriever 315 executes query A, and stores the result of query A in a temporary database (step 630). Retriever 315 then cyclically shifts in, for example, 1 bit increments the bits in Storage 320, and reexecutes query A after each shift (step 630).

Retriever 315 stores the result of each execution in the temporary database in the order of execution (step 640). Next, Retriever 315 shifts the results in the temporary database according to the address offset received from inquiring processor 100 (step 650). Retriever 315 executes query B in the temporary database (step 660), and sends the result of query B to inquiring processor 100. Inquiring processor 100 then extracts the selected information from the result of query B.

In accordance with an embodiment of the invention, inquiring processor 100 may also verify the validity of a commodity generated by server $110_1$ for affecting a private information exchange between inquiring processor 100 and database $120_1$. Commodity Generator 215 in server $110_1$ identifies a random address in Storage 320, and determines a private information retrieval query for encoding the random address. Commodity Generator 215 sends the random address and the query to inquiring processor 100 and database $120_1$, respectively. Retriever 315 executes the query on, for example, database $120_M$ whose contents are known to inquiring processor 100, and sends the result of the query to inquiring processor 100.

Inquiring processor 100 then decodes the result of the query, and determines whether the decoded result matches an entry at the specified random address in database $120_M$. When the decoded result matches the entry, inquiring processor 100 has verified the validity of the commodity generated by Commodity Generator 215, and thus, may use the commodity to privately retrieve selected information from database $120_1$ using any of the methods and systems disclosed herein. Inquiring processor 100 may repeat the above steps one or more times to enhance the accuracy of the verification.

In accordance with another embodiment of the invention, inquiring processor 100 verifies the validity of a commodity generated by server $110_1$ as follows: Commodity Generator 215 in server $110_1$ identifies a random address in Storage 320, and determines a private information retrieval query for encoding the random address. Commodity Generator 215 sends the random address and the query to inquiring processor 100 and database $120_1$, respectively. Inquiring processor 100 identifies the address of selected information in Storage 320 that inquiring processor 100 desires to retrieve without revealing to database $120_1$ the address of the selected information.

Retriever 315 executes the query received from server $110_1$ on database $120_M$ whose contents are known to inquiring processor 100, and sends the result of the query to the inquiring processor 100. Retriever 315 combines Storage 320 with the data stored in database $120_M$ by performing an exclusive OR operation on them. Retriever 315 then executes the query on the combined Storage 320 and the data stored in database $120_M$, and sends the result of the query to inquiring processor 100.

Inquiring processor 100 decodes the results received from database $120_1$, and extracts the selected information from the decoded results by, for example, performing an exclusive OR operation on the decoded results.

In accordance with yet another embodiment of the invention, inquiring processor 100 may also function as a server by performing steps 400, 410, and 430 (shown in FIG. 4) off-line, for example prior to identifying the address of selected information in database $120_1$, which inquiring processor 100 desires to privately retrieve from database $120_1$. In this embodiment, inquiring processor 100 determines two commodities, one for use by inquiring processor 100 and the other for use by database $120_1$. Inquiring processor 100 uses, for example, a probabilistic polynomial time sampling method to identify a random address in database $120_1$ (step 400) and to assemble a private information retrieval query for encoding the random address such that the random address is not revealed to database $120_1$ (step 410).

In an embodiment where contents of database $120_1$ are not replicated in any of databases $120_2$–$120_M$, the query may be determined using any conventional private information retrieval method or system, for example the methods and systems described in pending U.S. patent application Ser. No. 09/087,893, entitled "Method And Apparatus For Private Information Retrieval From A Single Electronic Storage Device," and E. Kushilevitz, and R. Ostrovsky, "Replication Is Not Needed: Single Database, Computationally Private Information Retrieval," in the proceedings of 38th Annual IEEE Symposium on the Foundations of Computer Science (1997).

Alternatively, in an embodiment where contents of database $120_1$ are replicated in one or more of databases $120_2$–$120_M$ and databases $120_1$–$120_M$ do not communicate with one another, the query may be determined using any conventional private information retrieval method or system for multiple non-communicating databases, for example the methods and systems described in G. Di-Crescenzo, Y. Ishai, and R. Ostrovsky, "Universal Service-Providers For Database Private Information Retrieval," ACM Symposium on Principles of Distributed Computing (1998), B. Chor and O. Goldreich et al., "Private Information Retrieval," 36th Annual IEEE Symposium On Foundations Of Computer Science (1995), and A. Ambainis, "Upper Bound On The Communication Complexity Of Private Information Retrieval," in the proceedings of 24th International Colloquium on Automata Languages and Programming, Volume 1256 (1997).

Inquiring processor 100 then sends the query to database $120_1$ (step 430).

When inquiring processor 100 desires to privately retrieve selected information from database $120_1$ without revealing the address of the selected information to database $120_1$, inquiring processor 100 determines an address offset by subtracting modulo N the random address determined at step 400 from the address of the selected information, and sends the address offset to database $120_1$.

When database $120_1$ receives the address offset, Retriever 315 performs steps 520–530 shown in FIG. 5. Retriever 315 cyclically shifts the bits in Storage 320 according to the address offset (step 520). Retriever 315 then executes the query on the cyclically shifted bits (step 530), and sends the result of the query to inquiring processor 100 (step 540).

When inquiring processor 100 receives the result of the query, it extracts the selected information in database $120_1$ from the result using, for example, the methods and systems disclosed in pending U.S. patent application Ser. No. 09/087,893, entitled "Method And Apparatus For Private Information Retrieval From A Single Electronic Storage Device," and E. Kushilevitz and R. Ostrovsky, "Replication Is Not Needed: Single Database, Computationally Private Information Retrieval," in the proceedings of 38th Annual IEEE Symposium on the Foundations of Computer Science (1997).

While it has been illustrated and described what are at present considered to be preferred embodiments and methods of the present invention, it will be understood by those skilled in the art that various changes and modifications may be made, and equivalents may be substituted for elements thereof without departing from the true scope of the invention.

In addition, many modifications may be made to adapt a particular element, technique or implementation to the teachings of the present invention without departing from the central scope of the invention. Therefore, it is intended that this invention not be limited to the particular embodiments and methods disclosed herein, but that the invention include all embodiments falling within the scope of the appended claims.

What is claimed is:

1. A method for privately retrieving selected information from a database in a communications network including a server, an inquiring processor distinct from said server and said database, and the database without requiring replication of the database, said method comprising the steps of:
    determining, at the server, a first and a second commodity, wherein said determining step comprises the steps of:
        identifying a random address in the database;
        determining a query for encoding the random address such that the random address is not revealed to the database;
        including the random address in the first commodity; and
        including the query in the second commodity;
    communicating the first commodity and the second commodity to the inquiring processor and the database, respectively; and
    retrieving the selected information from the database based on the first commodity and the second commodity such that the selected information is not revealed to the database.

2. The method of claim 1 wherein the first commodity further includes trapdoor information for decoding the result at the inquiring processor.

3. A method for privately retrieving selected information from a database, said method comprising the steps of:
    determining, at a server, a first commodity and a second commodity, said determining step comprising the steps of:
        identifying a first address in the database; and
        determining a query for encoding the first address;
    communicating the first commodity and the second commodity to an inquiring processor and the database, respectively; and
    retrieving the selected information from the database based on the first commodity and the second commodity such that the selection information is not revealed to the database, wherein said retrieving step comprises the steps of:
    identifying, at the inquiring processor, a second address in the database that includes the selected information;
    determining a difference between the second address and the first address, and communicating the determined difference to the database;
    cyclically shifting contents of the database according to the determined difference; and
    executing the query at the database, and transmitting a result of the query to the inquiring processor.

4. The method of claim 3 further comprising the step of: decoding the result at the inquiring processor.

5. A method for privately retrieving selected information from a database in a communications network including a plurality of servers, an inquiring processor distinct from said plurality of servers and said database, and the database without requiring replication of the database, said method comprising the steps of:
    determining, at a first server, a first commodity and a second commodity, wherein said determining step at the first server comprises the steps of:
        identifying a first random address in the database;
        determining a first query for encoding the first random address such that the first random address is not revealed to the database;
        including the first random address in the first commodity; and
        including the first query in the second commodity;
    determining, at a second server, a third commodity and a fourth commodity;
    communicating the first commodity and the third commodity to the inquiring processor;
    communicating the second commodity and the fourth commodity to the database;
    combining the second commodity and the fourth commodity at the database; and
    retrieving the selected information from the database based on the first commodity, the third commodity, and the combined second and fourth commodities such that the selected information is not revealed to the database.

6. The method of claim 5, wherein said determining step at the second server comprises the steps of:
    identifying a second random address in the database;
    determining a second query for encoding the second random address such that the second random address is not revealed to the database;
    including the second random address in the third commodity; and
    including the second query in the fourth commodity.

7. The method of claim 6 wherein said combining step comprises the step of:
    executing the first query at the database N times by cyclically shifting in increments contents of the database prior to each execution.

8. A method for privately retrieving selected information from a database, said method comprising the steps of:
    determining, at a first server, a first commodity and a second commodity, said determining step at the first server comprises the steps of:
        identifying a first address in the database; and
        determining a first query for encoding the first address;
    determining, at a second server, a third commodity and a fourth commodity, said determining step at the second server comprises the steps of:
        identifying a second address in the database; and
        determining a second query for encoding the second address;
    communicating the first commodity and the third commodity to an inquiring processor;
    communicating the second commodity and the fourth commodity to the database:
    combining the second commodity and the fourth commodity at the database, said combining step comprises the step of:
        executing the first query at the first database N times by cyclically shifting in increments contents of the database prior to each execution; and retrieving the selected information from the database based on the first commodity, the third commodity, and the combined second and fourth commodities such that the selected information is not revealed to the database, and wherein the retrieving step comprises the steps of:

identifying, at the inquiring processor, a third address in the database that includes the selected information;

determining a difference between the third address and the sum of the second address and the first address, and communicating the determined difference to the first database;

cyclically shifting results of the N executions according to the determined difference; and executing the second query based on the cyclically shifted results, and transmitting a result of the query to the inquiring processor.

9. The method of claim 8 further comprising the step of:

decoding the result of the second query at the inquiring processor.

10. A method for privately retrieving selected information from a database, said method comprising the steps of:

determining, at an inquiring processor, a first commodity and a second commodity, said determining step comprises the steps of:

identifying a first address in the database; and determining a query for encoding the first address;

communicating the second commodity to the database; and retrieving the selected information from the database based on the first commodity and the second commodity such that the selected information is not revealed to the database, and wherein said retrieving step comprises the steps of:

identifying, at the inquiring processor, a second address in the database that includes the selected information;

determining a difference between the second address and the first address, and communicating the determined difference to the database;

cyclically shifting contents of the database according to the determined difference; and executing the query at the database, and transmitting a result of the query to the inquiring processor.

11. The method of claim 10 further comprising the step of:

decoding the result at the inquiring processor.

* * * * *